United States Patent [19]

Kumazawa

[11] 4,103,827
[45] Aug. 1, 1978

[54] METHOD OF AND APPARATUS FOR GENERATING MIXED AND ATOMIZED FLUIDS

[75] Inventor: Toshiharu Kumazawa, Fujisawa, Japan

[73] Assignee: Mitsubishi Precision Co., Ltd., Kamakura, Japan

[21] Appl. No.: 725,567

[22] Filed: Sep. 22, 1976

[30] Foreign Application Priority Data

May 27, 1976 [JP] Japan .................... 51-060558
Jul. 8, 1976 [JP] Japan .................... 51-089803[U]

[51] Int. Cl.$^2$ ............................ B05B 7/00
[52] U.S. Cl. ............................. 239/8; 239/427; 239/434; 239/499; 239/515
[58] Field of Search ............. 239/8, 9, 102, 427–429, 239/434, 499, 514, 515

[56] References Cited

U.S. PATENT DOCUMENTS

| | | | |
|---|---|---|---|
| 425,246 | 4/1890 | Paget | 239/514 X |
| 1,415,141 | 5/1922 | Bohan | 239/514 X |
| 1,748,248 | 2/1930 | Shepherd | 239/8 |
| 3,070,313 | 12/1962 | Fortman | 239/102 |
| 3,169,509 | 2/1965 | Rich | 239/102 X |
| 3,224,488 | 12/1965 | Skonecke et al. | 239/505 X |
| 3,840,183 | 10/1974 | Kuribayashi | 239/305 |

*Primary Examiner*—Robert W. Saifer
*Attorney, Agent, or Firm*—Merchant, Gould, Smith, Edell, Welter & Schmidt

[57] ABSTRACT

A method of generating mixed and atomized fluids is disclosed in which at least two fluids selected from gases, liquids and powders, are flown through a flow passageway including a first convergent and a subsequent divergent flowing zones, whereby the fluids are subjected to change in pressure, thereby being mixed and atomized. The mixed and atomized fluids are spouted from a second convergent flowing zone at a high speed toward a fluid reflecting means. The spouted mixed fluids collide with the fluid reflecting means and are further mixed with one another and further atomized when the mixed fluids are reflected from the fluid reflecting means. A fluid spouting composite nozzle unit for practicing the method is also disclosed in which a first nozzle has the first convergent flowing zone and the divergent flowing zone, and a second nozzle has the second convergent flowing zone. The fluid reflecting means is disposed on the downstream side of the spouting hole of the second nozzle. The first and second nozzles and the fluid reflecting means are interconnected so that an assembled unit is formed.

10 Claims, 9 Drawing Figures

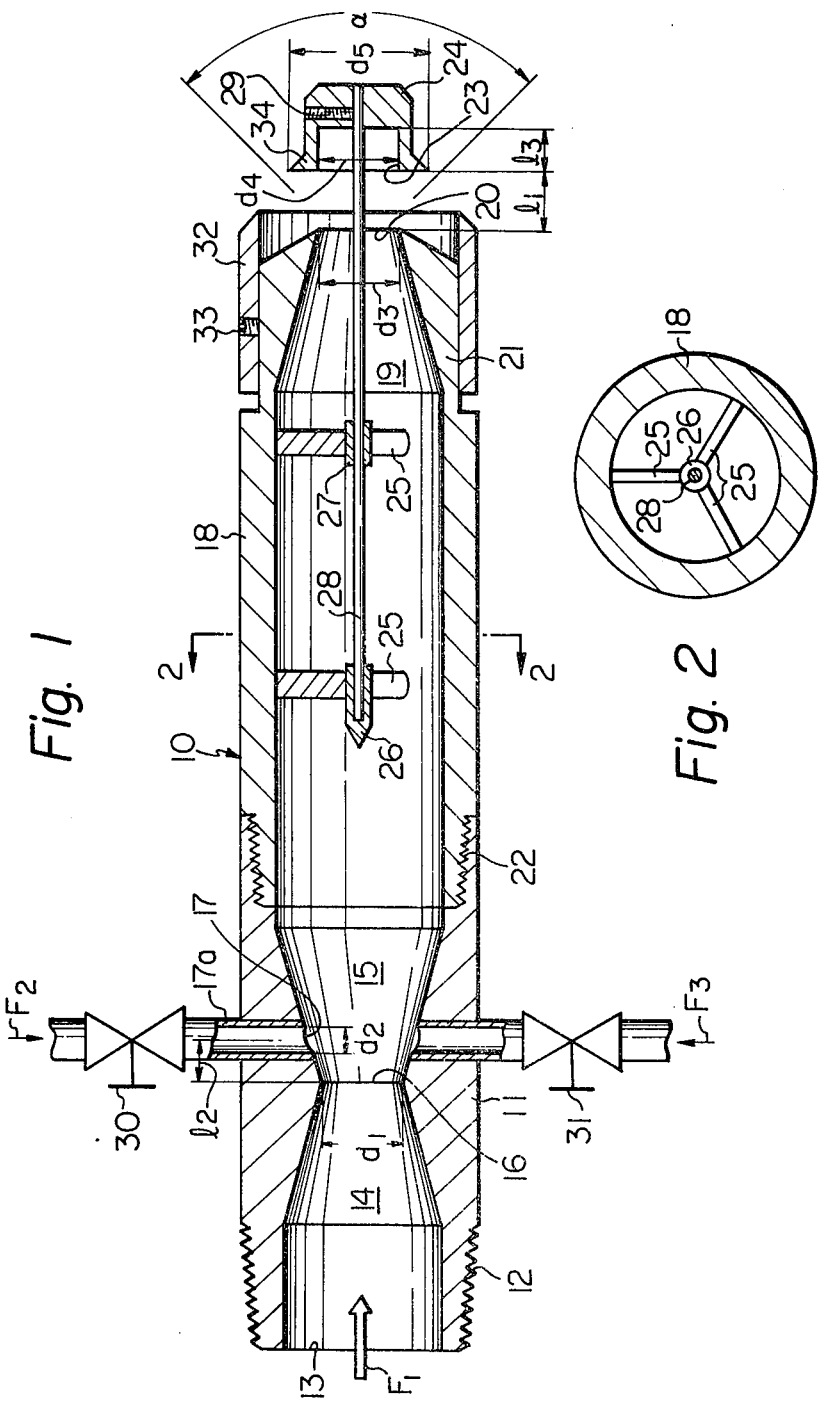

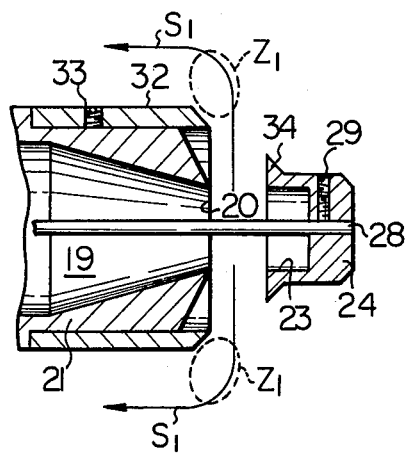
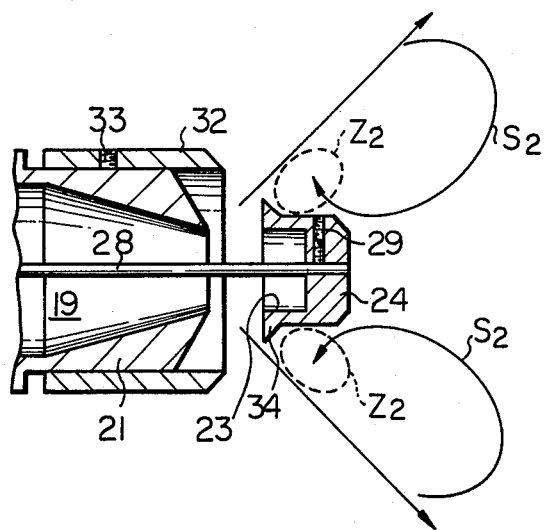

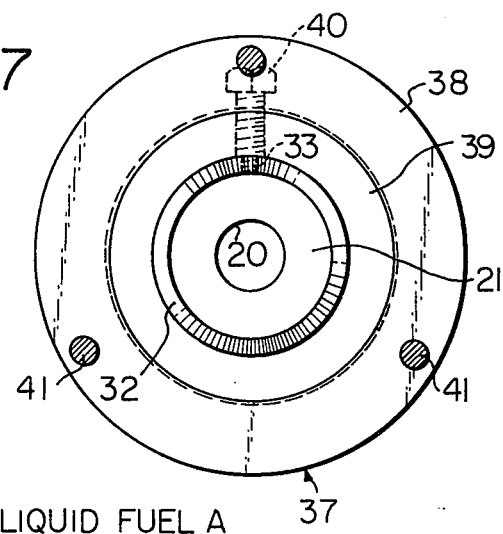
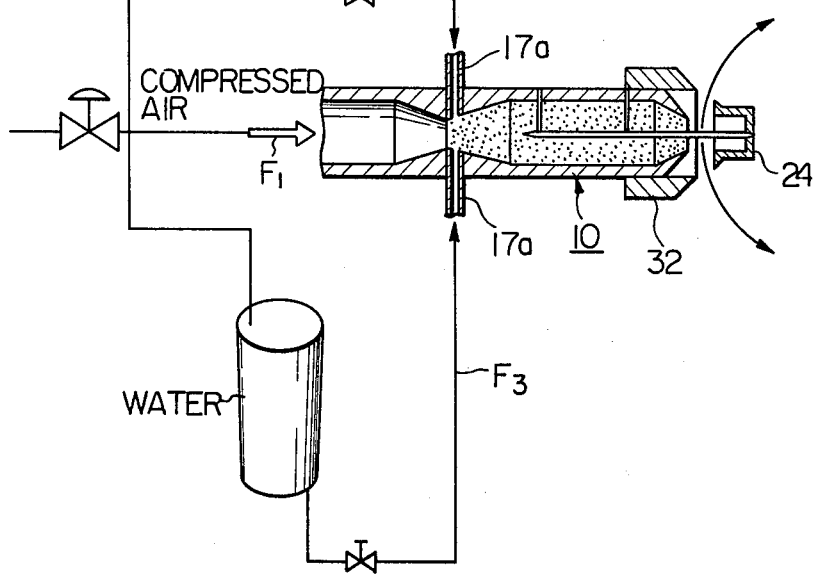

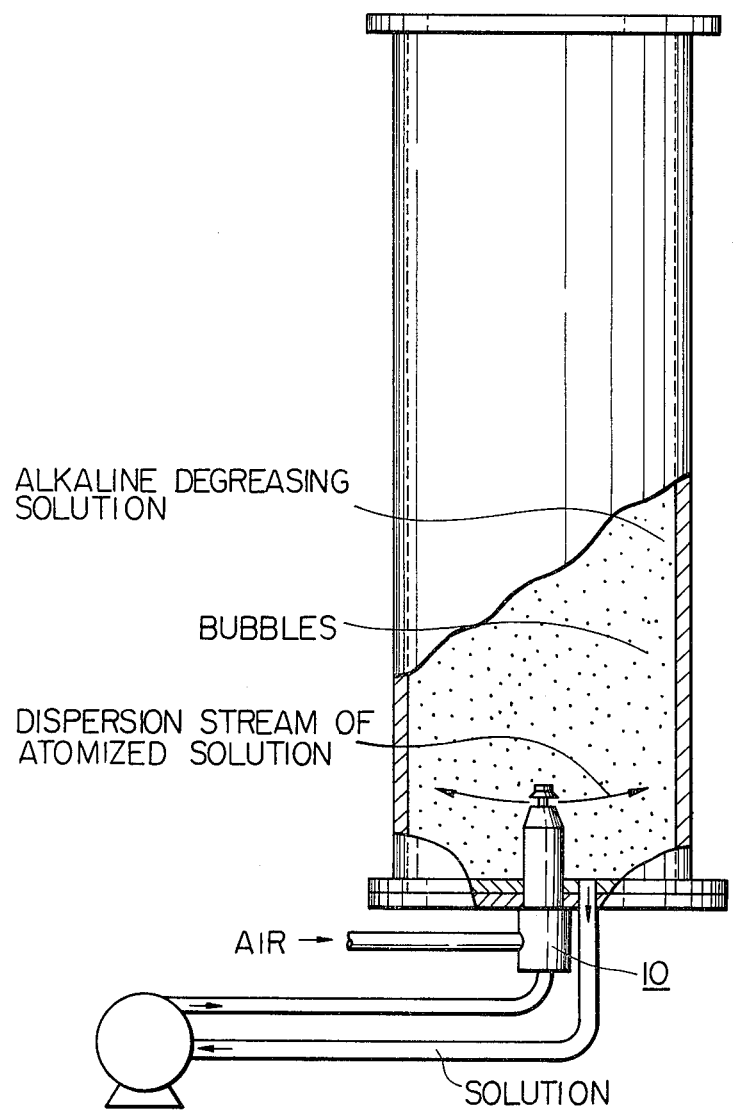

METHOD OF AND APPARATUS FOR GENERATING MIXED AND ATOMIZED FLUIDS

FIELD OF THE INVENTION

The present invention relates to a method and apparatus for mixing and atomizing fluids selected from gases, liquids and powders and spouting the mixed and atomized fluid in the form of a dispersion stream. More particularly, the invention relates to a method for mixing and atomizing fluids at two separate stages and spouting the resulting mixed fluids in the form of a dispersion stream, and to a composite nozzle unit for advantageously performing the method. The method and the composite nozzle unit described above are also adapted for use in finely atomizing a liquid or gas and dispersing the atomized liquid or gas into a gas or liquid.

BACKGROUND OF THE INVENTION

In order to atomize and disperse fluids, particularly liquids and gases, there have conventionally been provided diverse means, such as a nozzle employing mechanism, a rotary mechanism using a centrifugal force and an ultrasonic vibration mechanism generating ultrasonic vibrations electrically or mechanically. A method employing a nozzle element is the most convenient method for obtaining large quantities of fluid particles by simple mechanical means. In employing a nozzle element, the following two methods are quite conventional. That is, in a high pressure method, a liquid is sprayed by the nozzle element under a high pressure into a gas. In a different method, a liquid and gas are sprayed under high pressures from separate nozzle elements and the sprayed liquid and gas are caused to collide with one another, thereby obtaining a gas-liquid mixed spray. In each of these methods, however, in order to promote atmization of the liquid, it is necessary to pressurize the liquid or the liquid and gas from several atmospheres to scores of atmospheres. Further, since the liquid and gas must be sprayed from fine nozzle holes having a small diameter, various disadvantages are brought about. For example, clogging is readily caused in the fine nozzle holes, resulting in reduction of the spraying efficiency, and the fine hole is readily worn away and the operational efficiency is reduced. Still further, in the case of conventional nozzles, it is very difficult to form a mixed and atomized emulsion by supplying at least two liquids to one nozzle.

In view of such state of the art, a novel provision of a method and apparatus for simply and effectively atomizing and mixing fluids and spouting the fluid mixture in the form of a dispersion stream in a desired direction is required.

SUMMARY OF THE INVENTION

A primary object of the present invention is therefore to provide a method and apparatus according to which fluids, irrespective of whether they are gases, liquids or powders, are mixed and atomized at two different stages to obtain a completely atomized mixed fluid, and this atomized fluid mixture is spouted and dispersed into an external space occupied by a liquid or gas.

Another object of the present invention is to provide a composite nozzle unit in which the nozzle elements having a large spouting hole are connected to each other to promote stepwise mixing and atomization of fluids and the mixed fluid is spouted and dispersed at an optional dispersion angle.

Still another object of the present invention is to provide a fluid composite nozzle unit which can be manufactured relatively easily by mechanical cutting processing and assembling operation and which can mix and atomize fluids effectively and spout the mixed and finely atomized fluid at high efficiency in the form of a dispersion stream.

In accordance with one aspect of the present invention, there is provided a method of generating a flow of mixed and atomized fluids from at least two fluids selected from gases, liquids and powders, which comprises the steps of:

directing a flow of a first fluid flown along a conduit means into a flow passageway having a first convergent flowing zone and a divergent flowing zone fluidly connected to an end of said first convergent flowing zone, thereby generating a low pressure flow of the first fluid in said flow passageway;

introducing at least a flow of a second fluid into the low pressure flow of the first fluid, thereby causing a first stage mixing of the first and second fluids and also a first stage atomizing of the resulting mixed fluids in said flow passageway;

guiding a flow of the mixed fluids from said flow passageway into a subsequent flow passageway having a second convergent flowing zone thereby accelerating said flow of the mixed fluids;

spouting said flow of the mixed fluids from said second convergent flowing zone of the subsequent flow passageway at a high speed toward a reflecting means located on the downstream side of said second convergent flowing zone, thereby colliding said high speed flow of the mixed fluids with said reflecting means and generating a reflected flow of the mixed fluids reflected from said reflecting means, and;

colliding said reflected flow of the mixed fluids with a subsequent high speed flow of the mixed fluid subsequently spouted from said second convergent flowing zone, to cause a second stage mixing and atomizing of said mixed fluids while said mixed fluids are dispersed toward a space surrounding said reflecting means.

In accordance with another aspect of the present invention, there is provided a fluid spouting composite nozzle unit for generating mixed and atomized fluids from at least two fluids selected from gases, liquids and powders, which comprises:

a first nozzle means for effecting a first stage mixing and atomizing of the fluids;

a second nozzle means for spouting the fluids mixed and atomized by said first nozzle means toward a downstream side thereof;

a guide conduit means for guiding the fluids mixed and atomized by said first nozzle means to said second nozzle means;

a fluid reflecting means positioned on the downstream side of said second nozzle means for colliding therewith the mixed fluids spouted from said second nozzle means, thereby effecting a second stage mixing and atomizing of said mixed fluids while said fluids are dispersed from said fluid reflecting means, and;

means for interconnecting said first and second nozzle means, said guide conduit means and said fluid reflecting means.

As will be apparent from the foregoing description, the composite nozzle unit of the present invention has excellent functions of mixing and atomizing fluids and spouting the mixed and atomized fluid in a wide dispersion stream. Therefore, the composite nozzle unit of the present invention has the following various applications.

(1) When the composite nozzle unit of the present invention is disposed so that the spouting hole is directed to a gas, and one or more liquids are mixed and atomized, and, then dispersed and jetted into the gas from the composite nozzle unit, the composite nozzle unit of the present invention can be used as, for example, a nozzle for atomizing a liquid fuel or as a nozzle for mixing and atomizing at least two fuels with water or a chemical liquid additive, and dispersing and spouting the atomized mixture. When the composite nozzle unit, of the present invention is utilized in the foregoing manner, low-pollution combustion apparatuses, gas turbines and engines in which high efficiency combustion is conducted can be effectively constructed by using the nozzle unit of the present invention. Further, since the composite nozzle unit of the present invention can atomize highly viscous low-grade fuels or waste oils without clogging, combustion apparatuses for low-grade fuels or waste oils, apparatuses for atomizing and burning various waste liquids with fuel liquids and apparatuses for atomizing and spraying waste liquids alone to a combustion chamber can be effectively constructed by using the composite nozzle unit of the present invention. Furthermore, since the composite nozzle unit of the present invention can promptly evaporate and dry liquids by finely atomizing them, apparatuses for preparing uniform fine powders from solutions, and water atomising and spraying apparatuses for wetting or cooling, can be constructed by using the composite nozzle unit of the present invention. In addition, if the composite nozzle unit of the present invention is arranged so that a liquid is finely atomized, sprayed and dispersed into a gas, since sufficient contact can be attained between the liquid and gas, the composite nozzle unit of the present invention can be utilized as means for spraying into air water of a fish farming pond, contacting water with oxygen and returning the oxygen-rich water to the pond and as means for removing chlorine gas in city service water by spraying it into the atmosphere.

(2) If the fluid composite nozzle unit of the present invention is arranged so that the spouting hole is directed to a liquid and at least one gas is dispersed into the liquid as fine bubbles from the nozzle unit, the composite nozzle unit of the present invention can be used as, for example, nozzle means for finely atomizing and dispersing air or oxygen into a liquid. When the composite nozzle unit of the present invention is applied to such use, it can be utilized for a gas-liquid contact oxidation column in the desulfurization and denitrification process for exhaust gases, or as means for dissolving oxygen or other gas into a liquid in a fermentation tank, aeration means in the waste water or solution treatment process, gas-absorbing means and degassing means. Still further, when fine bubbles generated from the composite nozzle unit of the present invention are utilized, separating apparatuses for causing suspended substances or oil drops in liquids to rise and separating them from the liquids, apparatuses for substituting gases in liquids with other gas and apparatuses for substituting a corrosive gas with nitrogen gas in the sea water desalting process can be constructed by using the composite nozzle unit of the present invention.

(3) If the composite nozzle unit of the present invention is located in a liquid and if the liquid is mixed and atomized with another liquid while the liquid is recycled to the nozzle unit and the atomized liquid mixture is dispersed and jetted into the liquid, an apparatus for mixing at least two liquids effectively can be constructed by using the composite nozzle unit of the present invention.

(4) If the mixed fluid spouting hole of the composite nozzle unit of the present invention is directed to a gas and the nozzle unit is arranged so that at least one powder is dispersed and jetted from the composite nozzle unit, it is possible to atomize the powder, uniformallize powder particles and mix at least two powders homogeneously. For example, an apparatus for obtaining fine homogeneous powders by spouting and dispersing a heterogeneous powder together with a gas from the composite nozzle unit, and an apparatus for mixing spouting at least two powders can be conveniently constructed.

The present invention will become more readily apparent from the ensuing description with reference to the accompanying drawings wherein:

FIG. 1 is a longitudinal sectional view showing an embodiment of the fluid spouting composite nozzle unit according to the present invention;

FIG. 2 is a sectional view taken along the line 2—2 in FIG. 1;

FIGS. 3 and 4 are sectional views showing dispersion stream lines of the mixed fluid in the top end portion of the fluid spouting composite nozzle unit shown in FIG. 1;

FIG. 7 is a sectional view taken along the line 7—7 in FIG. 6;

FIG. 8 is a diagrammatic view showing an example of an application of the composite nozzle unit according to the present invention, and;

FIG. 9 is a schematic view showing another example of an application of the composite nozzle unit according to the present invention.

Figure 5:
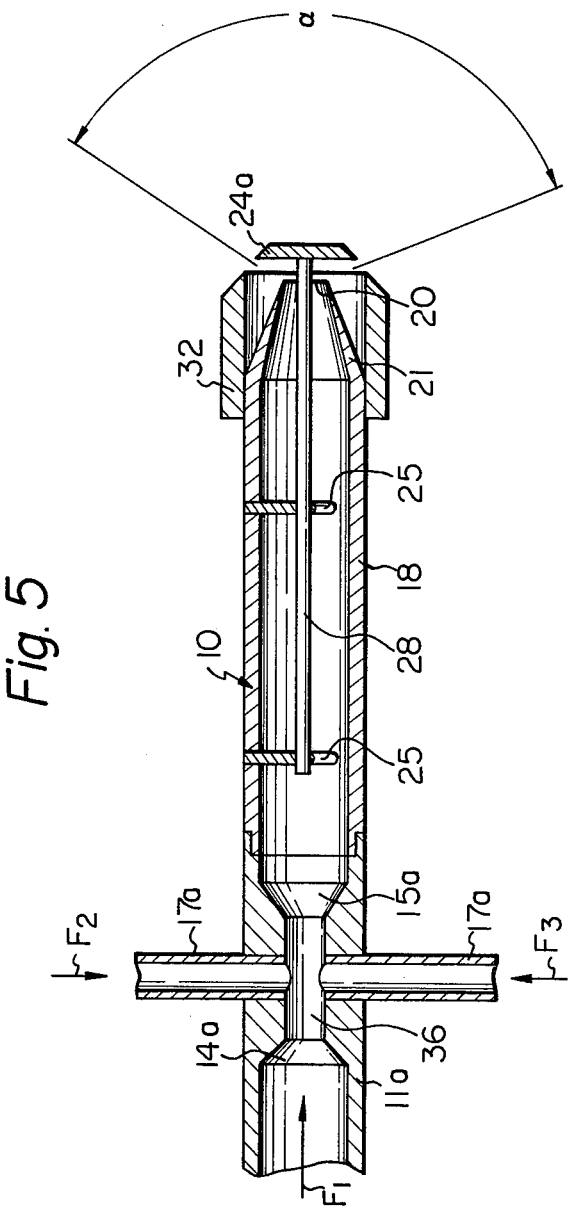
FIG. 5 is a longitudinal sectional view showing a modification of the embodiment of FIG. 1.

Referring now to FIGS. 1 and 2 showing one embodiment of the composite nozzle unit of the present invention, a preliminary mixing first nozzle 11 has a screw thread portion 12 to be connected to a fluid flow-in tube (not shown) and it includes a conical convergent passageway 14 for accelerating a fluid $F_1$ flown from a fluid inlet 13 and a conical divergent passageway 15 disposed concentrically with the convergent passageway 14. At least one fluid supply opening 17 (two fluid supply openings 17 facing each other in the section of the composite nozzle unit are shown in FIG. 1) having a diameter $d_2$ is disposed at a position deviated from a minimum diameter portion or throat 16 having a diameter $d_1$ toward the passageway 15. It is preferred that this fluid supply opening 17 be disposed perpendicularly to the central axis of the convergent passageway 14 and the divergent passageway 15 as shown in FIG. 1. A supply conduit 17a is firmly and fixed in the fluid supply opening 17. A hollow guide cylinder 18 is connected to the passageway 15 of the preliminary mixing first nozzle 11 to guide a mixed and atomized fluid jetted from the passageway 15. In the present embodiment, the guide cylinder 18 is formed as a cylindrical linear tube having a circular hollow flow passage. A mixed fluid second nozzle 21 having a conical convergent portion 19 and a circular mixed fluid spouting hole 20 having a diameter $d_3$ is formed on the end of the guide cylinder 18. The guide cylinder 18 is connected to the first nozzle 11 by means of a female and male screw engagement 22. In the present embodiment, the second nozzle 21 is integrally formed on the top end of the guide cylinder 18. If desired, it is possible to form the guide cylinder 18 and the second nozzle 21 separately and connect them by means of a screw engagement. The mixed fluid spouting hole 20 of the second nozzle 21 is disposed coaxially with the opening 15 of the first nozzle 11. A substantially cylindrical fluid reflecting device 24, provided with a circular reflecting cavity 23 of an inner diameter $d_4$, is disposed in front of and outside the spouting hole 20 coaxially therewith.

In the present embodiment, the fluid reflecting device 24 is extended along the central axis of the guide cylinder 18 and it is supported by a supporting rod 28 held by supporting members 26 and 27, each having three supporting legs 25 extended in the hollow passage of the guide cylinder 18 in the radial direction thereof as shown in FIG. 2. The fluid reflecting device 24 is fixed onto the supporting rod 28 by means of a screw 29, so that after the screw 29 is loosened to adjust the distance $l_1$ from the spouting hole 20, the fluid reflecting device 24 can be fastened to the supporting rod 28 again by the screw 29. If this distance $l_1$ is adjusted to an optimum distance as described hereinafter, it is preferred that a ring member (not shown) be pressed, on the outer periphery of the fluid reflecting device 24 so as to cover the screw 29 to prevent loosening of the screw 29 and completely fix the fluid reflecting device 24 to the supporting rod 28. If an appropriate notch or groove to be engaged with the front end of the screw 29 is formed on the supporting rod 28, fixing of the fluid reflecting device 24 to the supporting rod 28 can be further assured. In the composite nozzle unit having the above structure, since the pressure is hydrodynamically reduced in the divergent passageway 15 from which the fluid $F_1$ is jetted at a high speed, optional amounts of fluids $F_2$ and $F_3$ to be mixed and atomized are sucked from the fluid supply openings 17 into this pressure-reduced zone through flow control valves 30 and 31, whereby the fluids $F_2$ and $F_3$ are mixed and atomized with the fluid $F_1$. If the position of the fluid supply opening 17 is arranged so that the distance $l_2$ between the minimum diameter portion 16 and the center of the fluid supply opening 17 is in the range of $1.5 \times d_2$ to $3 \times d_2$, the pressure-reducing effect and the mixing and atomizing effect can be utilized most effectively. If the distance $l_2$ is smaller than $1.5 \times d_2$ and the fluid supply opening 17 is positioned closer to the minimum diameter portion 16, high speed jetting of the fluid $F_1$ is obstructed. Contrary to this, when the distance $l_2$ is larger than $3 \times d_2$ and the location of the fluid supply opening 17 is, accordingly, excessively spaced apart from the minimum diameter portion 16, the pressure-reducing effect and the mixing and atomizing effect are decreased. Further, if the first nozzle 11 is tapered so that the inclination angle is about 10° at the conical convergent passageway 14 and about 7.5° at the conical divergent passageway 15, and the effective flow passage sectional area of the mixed fluid spouting hole 20 of the second nozzle 21 (the value obtained by subtracting the sectional area of the supporting rod 28 from the entire sectional area of the spouting hole 20) is 1.0 to 3.0 times the flow passage sectional area of the minimum diameter portion 16 of the convergent passageway 14, the hydrodynamically pressure-reducing effect and the mixing and atomizing effect can be elevated to the highest levels. If the above effective sectional area is smaller than 1.0 times the sectional area of the minimum diameter portion 16, the inside pressure of the second nozzle 21 is elevated, and if the effective sectional area is larger than 3 times the sectional area of the minimum diameter portion 16, the speed of the mixed fluid spouted from the spouting hole 20 is reduced. In each case, the fluid mixing and atomizing effect is reduced. The fluid mixture composed of $F_1$, $F_2$ and $F_3$, which are mixed and atomized in the preliminary mixing first nozzle 11, is passed through the guide cylinder 18 and the flow speed of the fluid mixture is increased in a conical convergent portion 19 tapered to have an inclination angle of approximately 7.5°. The fluid mixture is then spouted from the spouting hole 20 of the second nozzle 21 at a high speed (the spouting speed can substantially be equal to sonic velocity) and is ejected into the interior of the reflecting cavity 23 of the fluid reflecting device 24 so as to impinge against the bottom wall of the cavity 23. Thus, the fluid mixture is reflected from the reflecting cavity 23 as a reflected jet stream. This reflected jet stream collides with the mixed and atomized fluid subsequently spouted from the spouting hole 20 of the second nozzle 21. Thus, in this reflecting and colliding zone, the mixing and atomizing action of the second stage takes place, and the mixed and atomized fluid is violently dispersed in an opened parachute-like shape. If the fluid reflecting device 24 is formed and arranged so that the depth $l_3$ of the circular reflecting cavity 23 is $\frac{1}{2}$ to $\frac{1}{3}$ of the inner diameter $d_4$ and that the inner diameter $d_4$ is 0.8 to 1.2 times the diameter $d_3$ of the mixed fluid spouting hole 20 of the second nozzle 21 and, further, that the maximum diameter $d_5$ of the fluid reflecting device 24 is less than 1.6 times the diameter $d_3$ of the spouting hole 20, the effect of reflecting the mixed fluid from the fluid reflecting device 24 and causing it to collide with the subsequent mixed fluid can be enhanced, and mixing and atomization of the mixed fluid can be further promoted. The dispersion angle $\alpha$ of the mixed fluid can be adjusted by increasing or decreasing the magnitude of the reflecting and colliding zone by changing the distance $l_1$ between the mixed fluid spouting hole 20 of the second nozzle 21 and the fluid reflecting device 24 as described hereinbefore.

More specifically, if $l_1$ is made smaller, the dispersion angle $\alpha$ is increased, and if $l_1$ is made larger, the dispersion angle $\alpha$ is decreased. If it is intended to decrease the dispersion angle $\alpha$ to an extreme extent, or to expand the dispersion angle beyond 180°, the distance $l_1$ is shortened to increase the dispersion angle $\alpha$ as much as possible and, in addition, a dispersion angle adjusting device 32 fitted to the top end of the second nozzle 21 coaxially therewith is retreated backwardly toward the upstream side in the axial direction. If the dispersion angle adjusting device 32 is pulled forwardly toward the fluid reflecting device 24, the dispersed stream of the fluid mixture is forcibly deviated forwardly and the dispersion angle $\alpha$ is decreased. In contrast, if the dispersion angle adjusting device 32 is moved backwardly, a low pressure zone $Z_1$ is hydrodynamically formed in the rear of the disposed stream of the mixed fluid as shown in FIG. 3, and the dispersed stream is sucked backwardly as indicated by a stream line $S_1$ of FIG. 3. The dispersion angle adjusting device 32 can be locked onto the outer periphery of the second nozzle 21 by means of a screw 33. If a flange-like projection 34 including a partial conical face is formed on the peripheral edge of the fluid reflecting hole 23, a reverse stream of the mixed fluid as indicated by a stream line $S_2$ in FIG. 4 is formed by the influence of a low pressure zone $Z_2$ hydrodynamically generated in front of the dispersed stream of the mixed fluid. That is to say, the provision of the flange-like projection is intended to cause a hydrodynamic generation of an active low pressure zone around the fluid reflecting device 24. Therefore, in the case where the composite nozzle unit of the present invention is used in a combustion apparatus for atomizing and spouting a liquid fuel to be burned, the reverse stream of the atomized liquid fuel formed in the manner described above, is very effective for stabilizing the combustion. The reverse stream of the atomized liquid fuel is also effective for supplying sufficient air for rapid combustion to take place in the combustion apparatus, since the reverse stream has an action of dragging therein air from the circumference thereof. The reverse stream of the atomized liquid fuel is further effective for preventing local elevation of the temperature in the combustion apparatus. In the case where the composite nozzle unit of the present invention is applied to the generation of fine bubbles in a liquid for the purpose of achieving a effective gas-liquid contact, agitating mixing of the gas and liquid and dissolution of the gas into the liquid can effectively be promoted. It should additionally be understood that in the composite nozzle unit having the construction described in the foregoing, the fluid passageway diameters of the first and second nozzles can be much larger than in the case of conventional nozzle elements having a fine spray nozzle, and therefore, the spouting efficiency is remarkably enhanced and occurrence of clogging trouble can be advantageously eliminated.

FIG. 5 shows a modification of the embodiment shown in FIGS. 1 and 2 in which a fluid reflecting device 24a is in the form of an impact plate having a flat surface facing the fluid spouting second nozzle 21. Further, in FIG. 5, a preliminary mixing first nozzle 11a is formed with a cylindrical passageway 36 between a conical convergent passageway 14a and a conical divergent passageway 15a. When the fluid $F_1$ is delivered into the first nozzle 11a at a high speed, a decrease of pressure occurs in the cylindrical passageway 36, since the cylindrical passageway 36 has the smallest sectional area. The fluids $F_2$ and $F_3$ to be mixed with one another are spouted into the fluid $F_1$ through supply conduits 17a, which open toward the cylindrical passageway 36. The mixed fluids are spouted from the spouting hole 20 of the second nozzle 21 toward the fluid reflecting plate 24a so that the fluids collide with the flat surface and the acute edge of the fluid reflecting plate 24a. As a result, the fluids are subjected to dispersing and reflecting actions by the fluid reflecting plate 24a. The dispersed and reflected fluids subsequently collide with the fluids which are subsequently spouted from the spouting hole 20 and with the acute end edge of the second nozzle 21. Thus, the fluids are further mixed with one another and further atomized during the colliding processes.

In the embodiment of FIG. 5, the fluid reflecting plate 24a is disposed so as to be perpendicular to the longitudinal axis of the second nozzle 21. However, if desired, the fluid reflecting plate 24 may be inclined with respect to the longitudinal axis of the second nozzle 21. As a result of such inclination, the fluids spouted from the spouting hole 20 of the second nozzle 21 can be dispersed by the fluid reflecting plate 24 in a particular desired direction.

Figure 6:
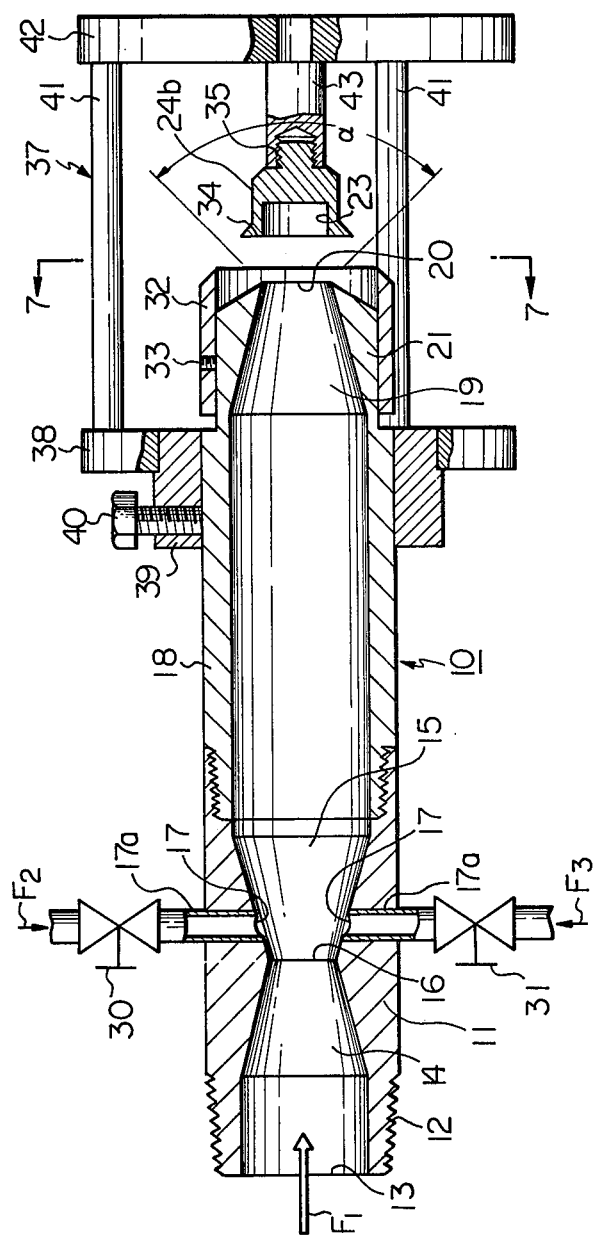
FIG. 6 is a longitudinal sectional view showing another embodiment of the fluid spouting composite nozzle unit according to the present invention.

FIGS. 6 and 7, wherein like reference numerals designate elements identical or similar to those shown in FIG. 1, illustrate another embodiment of the composite nozzle unit of the present invention. The construction shown in FIGS. 6 and 7 is different from that shown in FIGS. 1 and 2 in that the supporting legs, members are rod 25, 26, 27 and 28 of FIGS. 1 and 2 are eliminated and that a fluid reflecting device 24b of FIG. 6 is supported by a supporting frame 37. The fluid reflecting device 24b is disposed so that the reflecting cavity 23 faces the mixed fluid spouting hole 20 of the second nozzle 21. The supporting frame 37 comprises a supporting block 39 fixed to the outer periphery of the guide cylinder 18 by a clamping bolt 40, an annular supporting plate 38 press-fitted into the front end of the supporting block 39, posts 41 extended forwardly from the annular supporting plate 38 and a circular supporting plate 42 fixed to the front end of the posts 41. A stud 43 projected backwardly to the second nozzle 21 is fixed to the center of the circular supporting plate 42 and the fluid reflecting device 24b is screwed into the rear end of the stud 43 by a screw stud 35 of the device 24b. More specifically, the fluid reflecting device 24b is dismountably mounted on the supporting frame 37 by a screw engagement structure including this screw stud 35. Accordingly, if the circular reflecting cavity 23 is worn away by a long period of use, it may be exchanged for new one, and the reflecting device 24b can optionally be dismounted for the purpose of repair or maintenance. As will be apparent from the foregoing illustration, according to the present device, since the fluid reflecting device 24b is held and supported by the supporting frame 37 outside the body of the composite nozzle unit 10, it is possible to form the first nozzle 11, guide cylinder 18 and second nozzle 21 of the composite nozzle unit 10 so that each of the flow passageways of these members is kept in a completely hollow state. Accordingly, even if a fibrous material is incorporated in the first fluid $F_1$, the fibrous material is not caught on any of these flow passages and the occurrence of such troubles as clogging and jamming can be completely prevented. Simultaneously, the effective sectional areas of these flow passageways and the fluid spouting hole 20 can be increased. Still further, abrasive damage of structural parts present in the flow passageways by incorporation of solid substances can be completely prevented and, therefore, a long life of the composite nozzle unit 10 can be guaranteed. Further, in the structure of holding the fluid reflecting device 24b by the supporting frame 37, the holding rigidness or strength can be greatly increased, and if the peripheral face of the guide cylinder 18 is formed as a cylindrical face and the supporting block 39 is closely fitted onto this cylindrical face (see FIG. 7), and if the annular supporting plate 38 and circular supporting plate 42 are assembled concentrically with the supporting block 39, coaxial arrangement of the fluid reflecting device 24b with the fluid spouting hole 20 of the second nozzle 21 can be attained with certainty. Therefore, there is obtained an advantage that the fluid is dispersed uniformly around the central axis of the composite nozzle unit 10. The supporting frame 37 shown in FIGS. 6 and 7 is presented only for illustration, and effects similar to those described above can be obtained even if the supporting frame 37 is modified in various manners. Still further, by adjusting the position of attachment of the supporting frame 37 by the clamping bolt 40, the distance between the reflecting device 24b and the fluid spouting hole 20 can be adjusted and set appropriately.

Typical examples of application of the fluid spouting composite nozzle unit of the present invention will now be described.

EXAMPLE 1

The composite nozzle unit 10 of the present invention was used as a fuel spray nozzle of a flue type fire tube boiler system having an evaporation rate of 0.3 ton per hour. Water was mixed with 30 $l$/hr of fuel oil A and with air compressed to 0.8 kg/cm$^2$G, and the mixture was atomized and burnt. When the ratio (%) of water/(water + oil) × 100 was adjusted to 20, 25 or 30%, the nitrogen oxide concentration in the exhaust gas was reduced to 80, 55 or 40 ppm, respectively, at an oxygen content of 3%. In the case of a high pressure spray type nozzle heretofore used as the fuel spray nozzle, when 30 $l$/hr of fuel oil A was similarly burnt, the nitrogen oxide concentration in the exhaust gas was 80 to 120 ppm at an oxygen content of 3%. From the foregoing results, it will readily be understood that low-pollution combustion can be conducted very effectively by using the composite nozzle unit 10 of the present invention.

FIG. 8 is a diagram illustrating the arrangement of the above system including the composite nozzle unit 10 of the present invention.

EXAMPLE 2

The composite nozzle unit 10 of the present invention was used as a fuel spray nozzle of a double-shell water tube natural circulation boiler system having an evaporation rate of 3 tons per hour. Fuel oil A (260 $l$/hr) was atomized and sprayed with steam compressed to 2.8 kg/cm$^2$G, and secondary air for combustion was fed from a slit in the form of a thin air film at a rate of 60 m/sec uniformly into the surroundings at a point about 200 mm ahead from the spouting hole 20 of the composite nozzle unit 10, so that the thin air film was in parallel to the opened parachute-like conical face of the broad-angle dispersion pattern of the atomized fuel oil A spouted from the composite nozzle unit 10. Thus, combustion was effected while performing effectively premixing of fuel oil A and air and cooling of flames. The nitrogen oxide concentration in the exhaust gas was 40 ppm at an oxygen content of 4%. When a high pressure nozzle conventionally used as the fuel injection nozzle was employed, the nitrogen oxide concentration in the exhaust gas was 80 ppm at an oxygen content of 4%. From these results, it will readily be understood that the liquid fuel atomizing effect and the broad-angle dispersing effect by the composite nozzle unit of the present invention are very valuable for attaining low-pollution combustion.

EXAMPLE 3

The composite nozzle unit of the present invention was vertically disposed in the bottom portion of a cylindrical vessel having an inner diameter of 500 mm and a height of 2000 mm, in which 350 liters of a sodium sulfite solution was charged. From the composite nozzle unit of the present invention, 150 N$l$/min of air and 30 $l$/min of the sodium sulfite solution taken out from the vessel by pump circulation were mixed and atomized while bubbling air very finely, and the mixed and atomized fluid was spouted and dispersed into the sodium sulfite solution in the vessel, whereby the gas-liquid contact oxidation was performed. In the foregoing sentence the expression N$l$ means "converted gas volume under normal (or one) atmospheric pressure from pressurized gas volume." The oxidation rate attained was about 2 times as high as the oxidation rate attained by an ordinary aeration apparatus provided with perforated plates. It will readily be understood that the diameter of bubbles generated from the composite nozzle unit 10 of the present invention is very small, the gas-liquid contact area can be increased, fine bubbles can be dispersed at a broad dispersion angle and the gas-liquid contact can be accomplished effectively.

EXAMPLE 4

The composite nozzle unit 10 of the present invention was vertically disposed in the bottom portion of a vessel having an inner diameter of 300 mm and a height of 2000 mm, in which 100 $l$ of a waste emulsion (maintained at 55° C) composed of an alkaline degreasing solution customarily used in a machine-manufacturing or automobile-manufacturing process and 1.5% of oils contained therein were charged. From the composite nozzle unit 10 of the present invention, 1 N$l$/min of air and 15 $l$/min of the waste emulsion taken out of the vessel by pump circulation were mixed and spouted into the waste emulsion in the tank while bubbling air very finely, whereby oil drops were forced to rise in the state adhering to air bubbles and were thus separated from the waste emulsion. The oil content was then reduced below 0.1% and the oil-separated liquid could be used again as the degreasing solution. When an ordinary centrifugal separator was used for separating oils from the above waste emulsion, it was necessary to apply an acceleration of 8000 to 10000 G, resulting in increase of the equipment cost. Further, the processing capacity of this conventional apparatus was much lower than that of the composite nozzle unit 10 of the present invention. Thus, it was confirmed that the composite nozzle unit 10 of the present invention is very effective for separating oils and the like from waste liquids. FIG. 9 is a diagrammatic view illustrating the state of disposition of the composite nozzle unit 10 in practising this fourth example.

Although the constructions, operations, effects and practical applications of the typical embodiments of the composite nozzle unit of the present invention have been described, it is to be understood that various modifications and variations may be made to the construction and arrangement of elements of the composite nozzle unit of the present invention. For example, the first nozzle may be connected to the second nozzle by an appropriate piping instead of the fluid guide cylinder used in the illustrated embodiments. Further, if desired, a plurality of composite nozzle units of the present invention may be disposed in parallel so as to enhance the mixing and atomizing effect in various applications as described in the foregoing. Also, a plurality of composite nozzle units of the present invention may be arranged in series in a deep fluid tank so that the mixing and atomizing operations and the dispersing operation are performed in a multi stage manner.

What is claimed is:

1. A method of generating a flow of mixed and atomized fluids from at least two fluids selected from gases, liquids and powders, said method comprising the steps of:

directing a flow of a first fluid along a conduit means into a flow passageway having a first convergent flowing zone and a divergent flowing zone fluidly connected to an end of said first convergent flowing zone, thereby generating a low pressure flow of the first fluid in said flow passageway;

separately and concurrently introducing at least two separate flows of a second fluid into the low pressure flow of the first fluid thereby causing a first stage mixing of the first and second fluids and also a first stage atomizing of the resulting mixed fluids in said flow passageway;

guiding a flow of the mixed fluids from said flow passageway into a subsequent flow passageway having a second convergent flowing zone, thereby accelerating said flow of the mixed fluids;

spouting said flow of the mixed fluids from said second convergent flowing zone of the subsequent flow passageway at a side of said second convergent flowing zone, thereby colliding said high speed flow of the mixed fluids with said reflecting means and generating a reflected flow of the mixed fluids reflected from said reflecting means, and;

colliding said reflected flow of the mixed fluids with a subsequent high speed flow of the mixed fluid subsequently spouted from said second convergent flowing zone, to cause a second stage mixing and atomizing of said mixed fluids while said mixed fluids are dispersed toward a space surrounding said reflecting means.

2. A method according to claim 1 including the step of introducing the flows of a plurality of further fluids separately and concurrently into the low pressure flow of the first fluid.

3. A fluid spouting composite nozzle unit, for generating mixed and atomized fluids from at least two fluids selected from gases, liquid and powders, comprising in combination:

first nozzle means for effecting a first stage mixing and atomizing of the fluids;

second nozzle means for spouting the fluids mixed and atomized by said first nozzle means toward a downstream side thereof;

guide conduit means for guiding the fluids mixed and atomized said first nozzle means to said second nozzle means;

fluid reflecting means positioned on the downstream side of said second nozzle means for cooperation therewith to define an outlet space in which fluid from said second nozzle means collides with fluid reflected from said reflecting means, the shape and size of said space being determined by the configurations, dimensions, and spacing of said reflecting means and said second nozzle; and means for interconnecting said first and second nozzle means, said conduit means, and said fluid reflecting means, wherein said first nozzle means has a conical convergent passageway, a conical divergent passageway concentrically connected to said conical convergent passageway and at least two fluid supply openings into said conical divergent passageway, and wherein said second nozzle means has a conical convergent passageway.

4. A fluid spouting composite nozzle unit as claimed in claim 3, wherein the outlet of said second nozzle means has an open area which is 1.0 to 3.0 times the minimum open area of said conical convergent passageway of said first nozzle means.

5. A fluid spouting composite nozzle unit as claimed in claim 3, wherein said fluid supply opening of said first nozzle means is positioned so that an axial distance measured from said throat of said conical convergent passageway to the center of said fluid supply opening is 1.5 to 3 times the diameter of said fluid supply opening.

6. A fluid spouting composite nozzle unit as claimed in claim 3 wherein said guide conduit means comprises a hollow cylindrical element coaxially connecting said first and second nozzle means and having mounted therein a supporting structure to support the fluid reflecting means, said element being of sufficient length to promote the mixing and atomizing of the fluids passing therethrough by the help of said supporting means.

7. A fluid spouting composite nozzle unit as claimed in claim 3 wherein each said fluid supply opening is disposed at the lowest pressure zone hydrodynamically created in said divergent passageway by flow of said first fluid in said first nozzle means.

8. A fluid spouting composite nozzle unit for generating mixed and atomized fluids from at least two fluids selected from gases, liquids, and powders, comprising, in combination:

nozzle means for receiving a first stage mixture of said fluids and spouting said mixture toward a downstream side thereof; and fluid reflecting means positioned on the downstream side of said second nozzle means for cooperation therewith to define an outlet space in which fluid from said second nozzle means collides with fluid reflected from said reflecting means, the shape and size of said space being determined by the configurations, dimensions, and spacing of said reflecting means and said second nozzle, wherein said fluid reflecting means comprises a substantially cylindrical element provided, at one end thereof facing said second nozzle means, with a circular cavity into which said fluids are spouted from said second nozzle means, and wherein said cylindrical element is further provided, at said one end thereof, with a flange-like projection for generating a low-pressure zone around said cylindrical element when said fluids are spouted from said second nozzle means.

9. A fluid spouting composite nozzle unit for generating mixed and atomized fluids from at least two fluids selected from gases, liquids, and powders, comprising in combination:

first nozzle means for effecting a first stage mixing and atomizing of the fluids;

second nozzle means for spouting the fluids mixed and atomized by said first nozzle means toward a downstream side thereof;

guide conduit means for guiding the fluids mixed and atomized by said first nozzle means to said second nozzle means;

fluid reflecting means positioned on the downstream side of said second nozzle means for cooperation therewith to define an outlet space in which fluid from said second nozzle means collides with fluid reflected from said reflecting means, the shape and size of said space being determined by the configurations, dimensions, and spacing of said reflecting means and said second nozzle; and means for interconnecting said first and second nozzle means, said guide conduit means, and said fluid reflecting means, wherein said nozzle unit further comprises hollow annular dispersion angle adjusting means mounted on said second nozzle means, said dispersion angle adjusting means being axially movable to adjust the angle through which said fluids are spouted from said outlet space.

10. A fluid spouting composite nozzle unit for generating mixed and atomized fluids from at least two fluids selected from gases, liquids and powders, comprising in combination:

first nozzle means for effecting a first stage mixing and atomizing of the fluids;

second nozzle means for spouting the fluids mixed and atomized by said first nozzle means toward a downstream side thereof;

guide conduit means for guiding the fluids mixed and atomized by said first nozzle means to said second nozzle means;

fluid reflecting means positioned on the downstream side of said first nozzle means for cooperation therewith to define an outlet space in which fluid from said second nozzle means collides with fluid reflected from said reflecting means, the shape and size of said space being determined by the configurations, dimensions, and spacing of said reflecting means and said second nozzle; a means for interconnecting said first and second nozzle means, said guide conduit means, and said fluid reflecting means, in which said first nozzle means comprises means directing a flow of a first fluid into a flow passageway having a first, convergent flowing zone and a second, divergent flowing zone connected thereto to generate a low pressure zone in said divergent flow zone hydrodynamically, and means for separately and concurrently introducing flows of a plurality of further fluids into the low pressure flow of the first fluid.

* * * * *

UNITED STATES PATENT AND TRADEMARK OFFICE
CERTIFICATE OF CORRECTION

PATENT NO. : 4,103,827
DATED : August 1, 1978
INVENTOR(S) : Toshiharu Kumazawa

It is certified that error appears in the above-identified patent and that said Letters Patent are hereby corrected as shown below:

Column 5, line 4, "top" should be deleted.
Column 6, line 60, "disposed" should be --dispersed--.
Column 8, line 4, "are" should be --and--.

Claim 10, column 14, line 4, after "nozzle" delete "a" and insert --and--.

Signed and Sealed this

Twentieth Day of March 1979

[SEAL]

Attest:

RUTH C. MASON
Attesting Officer

DONALD W. BANNER
Commissioner of Patents and Trademarks